United States Patent [19]
Winslow et al.

[11] Patent Number: 5,209,400
[45] Date of Patent: May 11, 1993

[54] PORTABLE CALCULATOR FOR REFRIGERATION HEATING AND AIR CONDITIONING EQUIPMENT SERVICE

[75] Inventors: John M. Winslow, 27496 Whitcomb Dr., Livonia, Mich. 48154; Henry D. Winslow, 9375 Dale, Redford Township, Wayne County, Mich. 48239; Walter Rubinstein, Southfield, Mich.

[73] Assignees: John M. Winslow, Livonia; Henry D. Winslow, Redford Township, Wayne County, both of Mich.

[21] Appl. No.: 666,130

[22] Filed: Mar. 7, 1991

[51] Int. Cl.$^5$ .......................... G05D 23/00
[52] U.S. Cl. ..................... 236/94; 62/127; 431/13; 431/18; 73/112; 165/11.1
[58] Field of Search .............. 165/11.1; 431/90, 13, 431/89, 18; 236/94; 364/510, 506, 509, 557, 558; 73/112; 62/127, 126; 235/145 R

[56] References Cited

U.S. PATENT DOCUMENTS

| | | | |
|---|---|---|---|
| 2,593,659 | 4/1952 | Dickey | 73/112 |
| 3,328,767 | 6/1967 | Ottaway | 340/172.5 |
| 4,114,448 | 9/1978 | Merritt | 62/129 |
| 4,213,089 | 7/1980 | Liebermann | 324/115 |
| 4,296,727 | 10/1981 | Bryan | 165/11 R |
| 4,653,288 | 3/1987 | Sayo et al. | 62/210 |
| 4,660,386 | 4/1987 | Hansen et al. | 62/126 |
| 4,661,459 | 4/1987 | Hirtz | 436/25 |
| 4,745,767 | 5/1988 | Ohya et al. | 62/211 |
| 4,787,213 | 11/1988 | Gras et al. | 62/212 |
| 4,829,777 | 5/1989 | Matsuoka et al. | 62/212 |

OTHER PUBLICATIONS

Ashrae Handbook, Chapter 6 Psychrometrics 1985, pp. 6.1, 6.2 and 6.6–6.20.

*Primary Examiner*—John Sollecito
*Attorney, Agent, or Firm*—Krass & Young

[57] ABSTRACT

A calculator apparatus 10 includes the standard calculator mode and several other modes functions namely; a pressure-temperature conversion, a temperature-to-pressure conversion based on refrigerant, a relative humidity reading based on input of the dry bulb and wet bulb temperature; and a flow-energy rate conversion mode based upon a selected fuel meter dial and Metric or English units. In addition, a Fahrenheit-to-centigrade conversion and a centigrade-to-Fahrenheit conversion functions are incorporated. The calculator includes a keyboard 18, a microprocessor 16, a timer 26, a power source 12, a switch 14 and a display screen 22.

7 Claims, 18 Drawing Sheets

FIG - 1
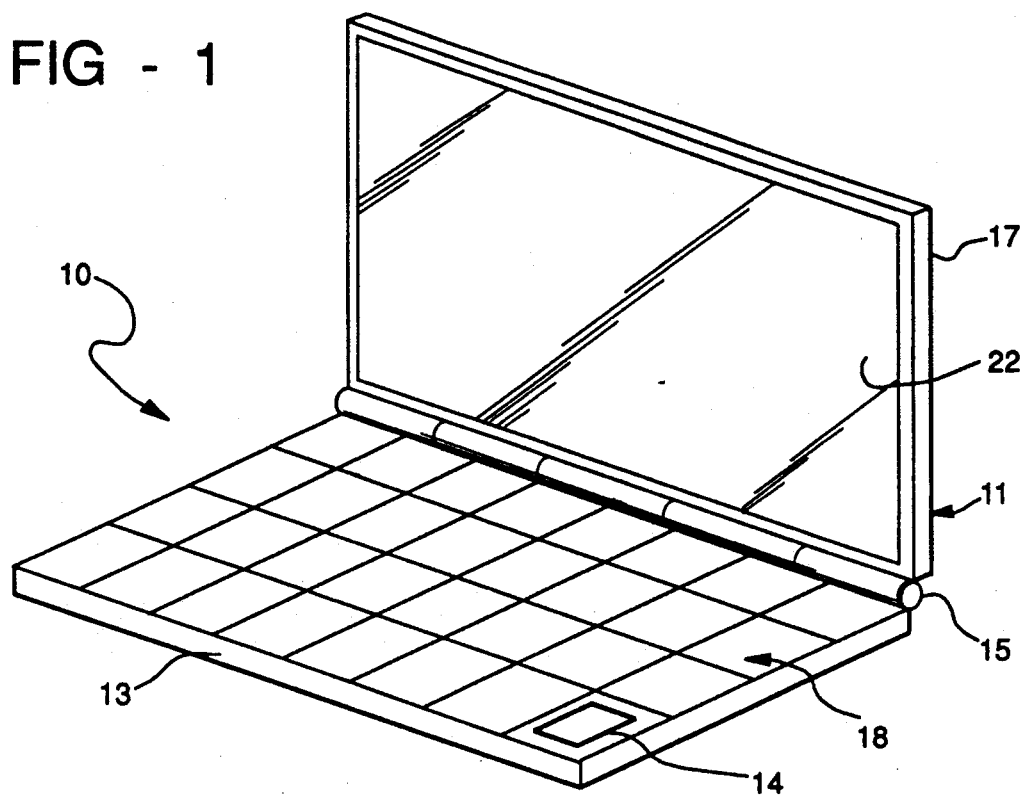
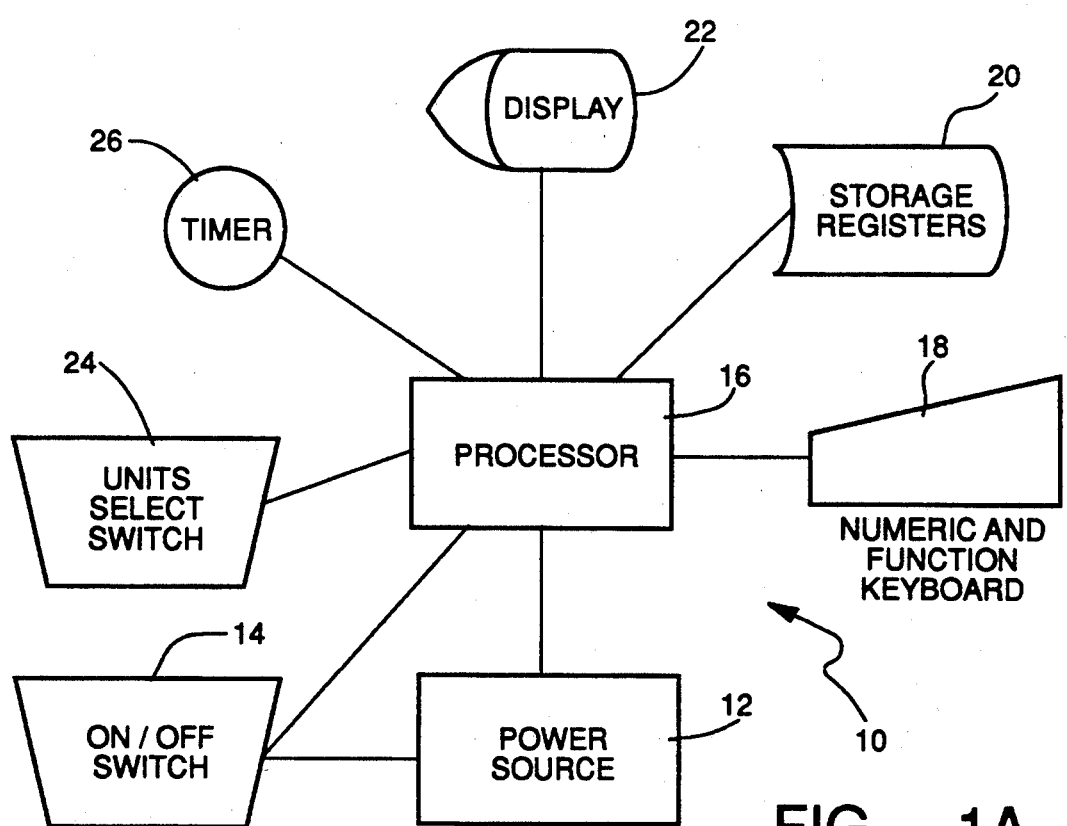
FIG - 1A

FIG - 24
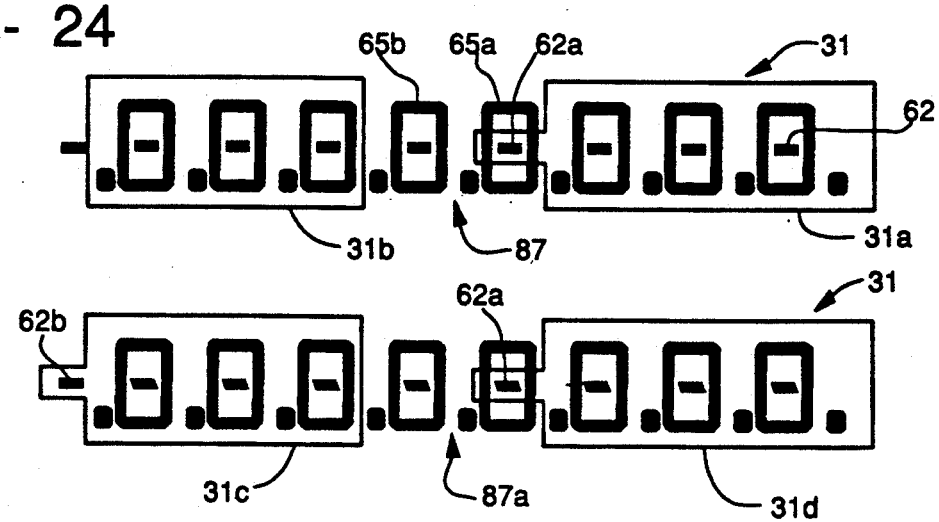
FIG - 25
FIG - 7
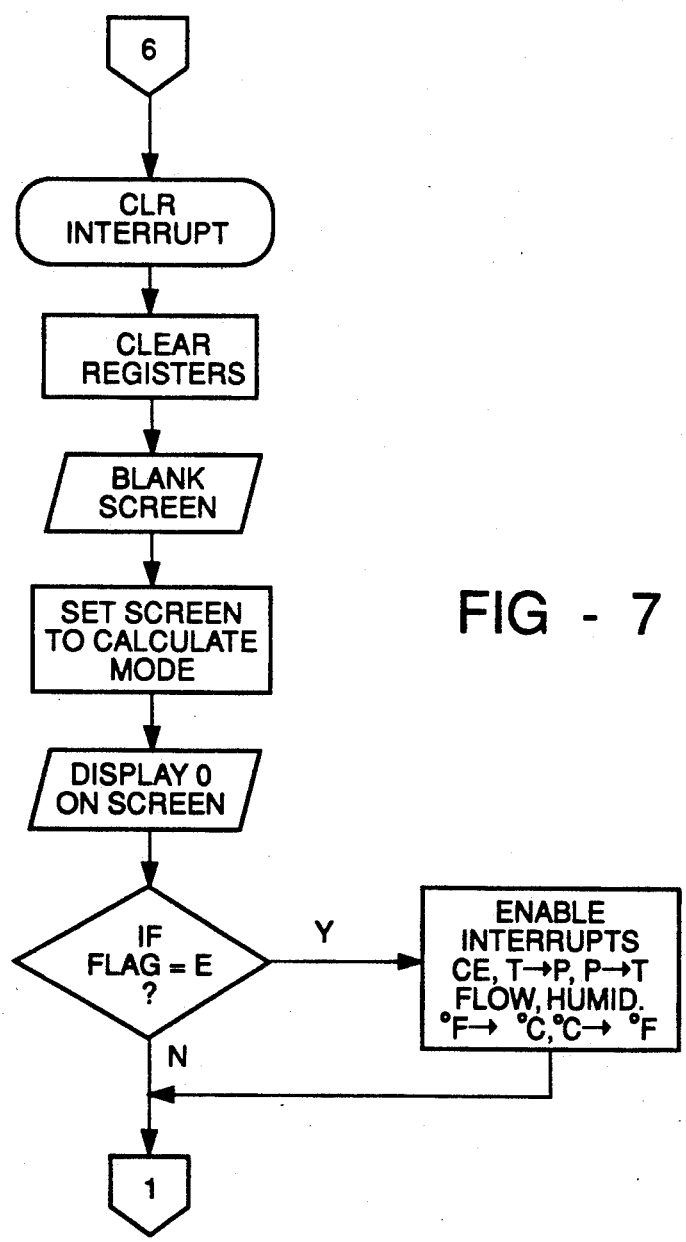

FIG - 12
FIG - 13
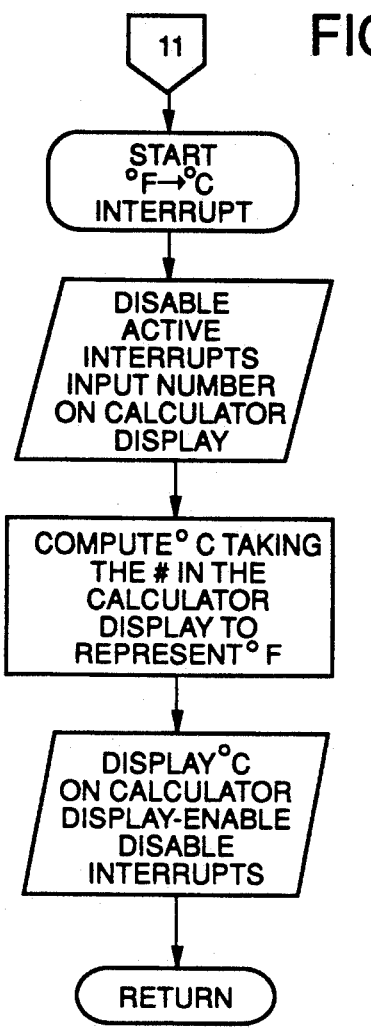
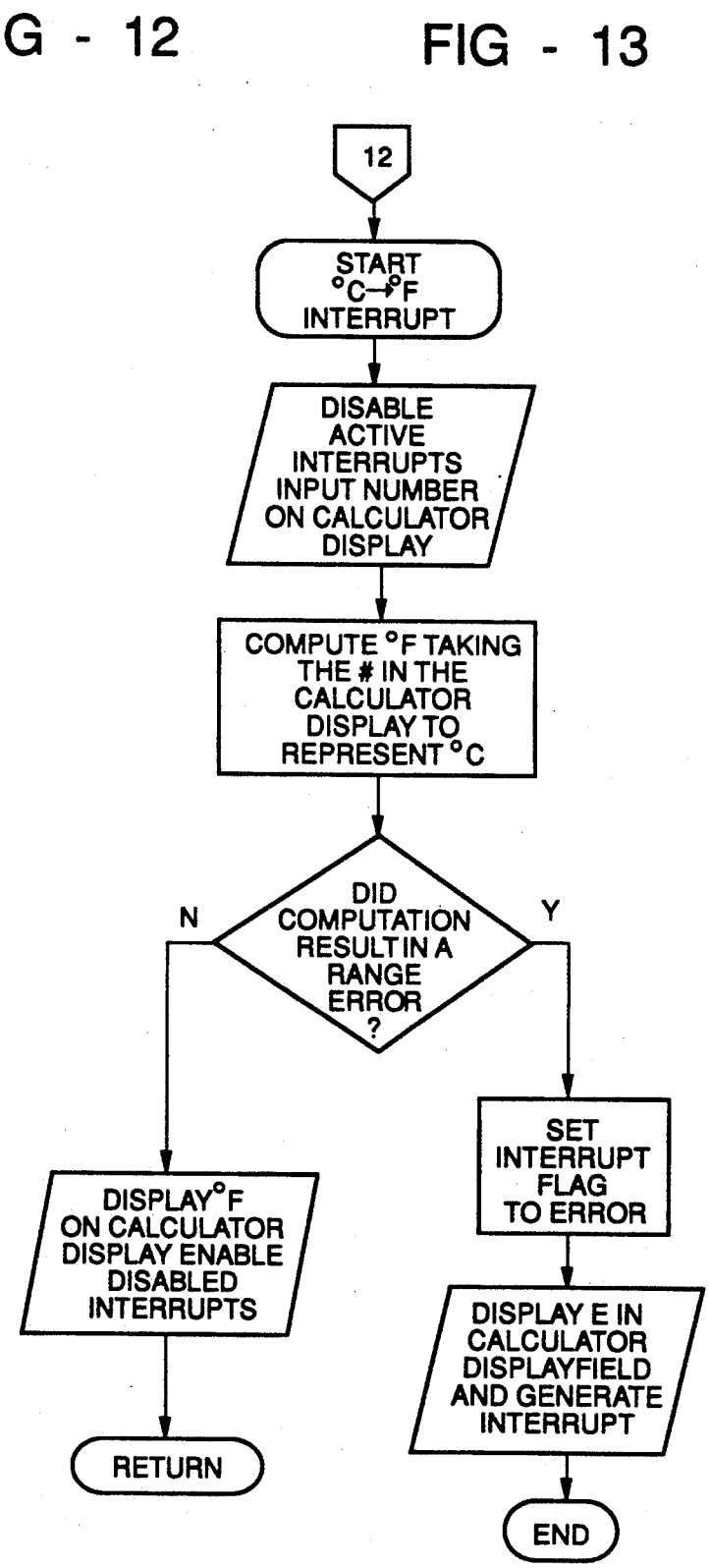

5,209,400

PORTABLE CALCULATOR FOR REFRIGERATION HEATING AND AIR CONDITIONING EQUIPMENT SERVICE

TECHNICAL FIELD

This invention relates to a calculator apparatus and more particularly to a portable calculator apparatus that is useful in servicing refrigeration, heating and air conditioning equipment.

BACKGROUND OF THE INVENTION

Furnaces and refrigeration units are relatively high maintenance units. It is important to maintain refrigeration and heating units in top condition to save on energy costs, to prolong the life of the unit, and to provide a dependable source of cooled or heated air.

Furnaces commonly need replacement because they are operated over their rated capacity. When a furnace is operating above its rated capacity, the fuel flow into the furnace is great enough to create a flame sufficiently hot to cause damage to the interior parts including the burner. Furthermore, since furnaces are commonly rated in terms of energy rate such as btu's per hour, and not fuel flow rate in cubic feet of gas, it is tedious to manually perform the equation for converting the fuel flow to consuming energy rate (referred to as the firing rate) of the unit.

Because service people who service furnaces also service refrigeration units, they also commonly carry charts that convert refrigerant pressure to a refrigerant temperature based upon the particular refrigerant and conversely convert refrigerant temperature to a refrigerant pressure. Additional charts are also used to find relative humidity based upon dry bulb and wet bulb temperatures. These charts are established from well known equations.

What is needed is a calculator apparatus that can eliminate the need for various charts. It is desirable to have a calculator apparatus that can easily calculate the conversion equations and convert fuel flow into an energy rate based upon the movement of an energy dial such that a single operator can time fuel flow and calculate the energy rate of consumption from the timed fuel flow. Furthermore, it is desired to have a calculator that converts line pressure of refrigerant into temperature and temperature into a pressure within the refrigerant line. Furthermore, it is also desirable to have the calculator able to calculate relative humidity based upon dry bulb and wet bulb temperature inputs.

SUMMARY OF THE INVENTION

In accordance with one aspect of the invention, a calculator apparatus has a keyboard for entering numbers and arithmetic operators, a display screen, a power source, and an on/off switch. The calculator apparatus has a temperature-to-pressure conversion mode such that when a temperature is inputted via the keyboard and a refrigerant is selected via the keyboard, the corresponding pressure is determined and displayed. A pressure-to-temperature conversion mode also is desirable such that when the pressure is inputted via the keyboard and the refrigerant is selected via the keyboard the corresponding temperature is determined and displayed. A relative humidity calculation mode includes a dry bulb temperature input and a wet bulb temperature input via the keyboard to calculate the corresponding relative humidity. A flow-energy rate conversion mode includes a selection of units of flow of metered fuel via the keyboard, and a timer mechanism activated and deactivated via the keyboard to measure elapsed time for calculating the energy rate supply by the fuel flow of the metered fuel using standard conversion equations. A selector button selects one of the above-mentioned modes and the display screen indicates one of the corresponding pressures, corresponding temperatures, relative humidity and energy rate corresponding to the selector mode.

The calculator apparatus has an indicator means for indicating activation of the timer mechanism. Preferably, the indicator is a flashing visual indicator such as an LCD being alternately activated and deactivated. Preferably, this visual indicator is incorporated in the display screen.

The calculator apparatus includes a Metric/English conversion mode and a Fahrenheit-to-centigrade temperature convertor and a centigrade-to-Fahrenheit convertor. The preferred embodiment of the calculator apparatus includes a selector mechanism for selecting a particular refrigerant in the temperature/pressure conversion modes. Furthermore, the flow-energy rate conversion mode includes a selector for selecting a particular dial of a fuel meter which is to be timed for one revolution in calculating the energy rate of the fuel flow.

In accordance with another aspect of the invention a display screen includes a numerical display of a predetermined member of digits for use in an arithmetic calculator mode. The calculator apparatus can be placed in a different mode wherein the numerical display can be divided into a first section and second section where a numerical value can be displayed in each first and second section. Desirably in the pressure to temperature and temperature to pressure conversion modes, one value is inputted and displayed in a first section and upon calculation actuation, a second value is computed and displayed in the second section. Desirably in the relative humidity calculation mode, a dry bulb and wet bulb temperature is inputted and displayed in the first and second sections and upon calculation actuation, said dry bulb and wet bulb values are removed and replaced by a third value indicating relative humidity.

BRIEF DESCRIPTION OF THE DRAWINGS

Reference now is made to the accompanying drawings in which:

FIG. 1 is a perspective view of a portable calculator apparatus in a hand held closable housing in accordance with the teachings of the present invention;

FIG. 1a is a block diagram of a preferred embodiment constructed in accordance with the teachings of the present invention;

FIG. 2 is a block diagram illustrating the various systems in the embodiment shown in FIG. 1a;

FIG. 7 is a flow chart illustrating the Clear interrupt;

FIG. 12 is a flow chart illustrating the Fahrenheit-to-centigrade conversion system;

FIG. 13 is a flow chart illustrating the centigrade-to-Fahrenheit conversion system;

FIG. 24 is a detailed schematic view of the alpha-numerical display shown in FIG. 19; and FIG. 25 is another detailed schematic view of the alpha-numeric display.

DETAILED DESCRIPTION OF THE PREFERRED EMBODIMENT

Figure 2:
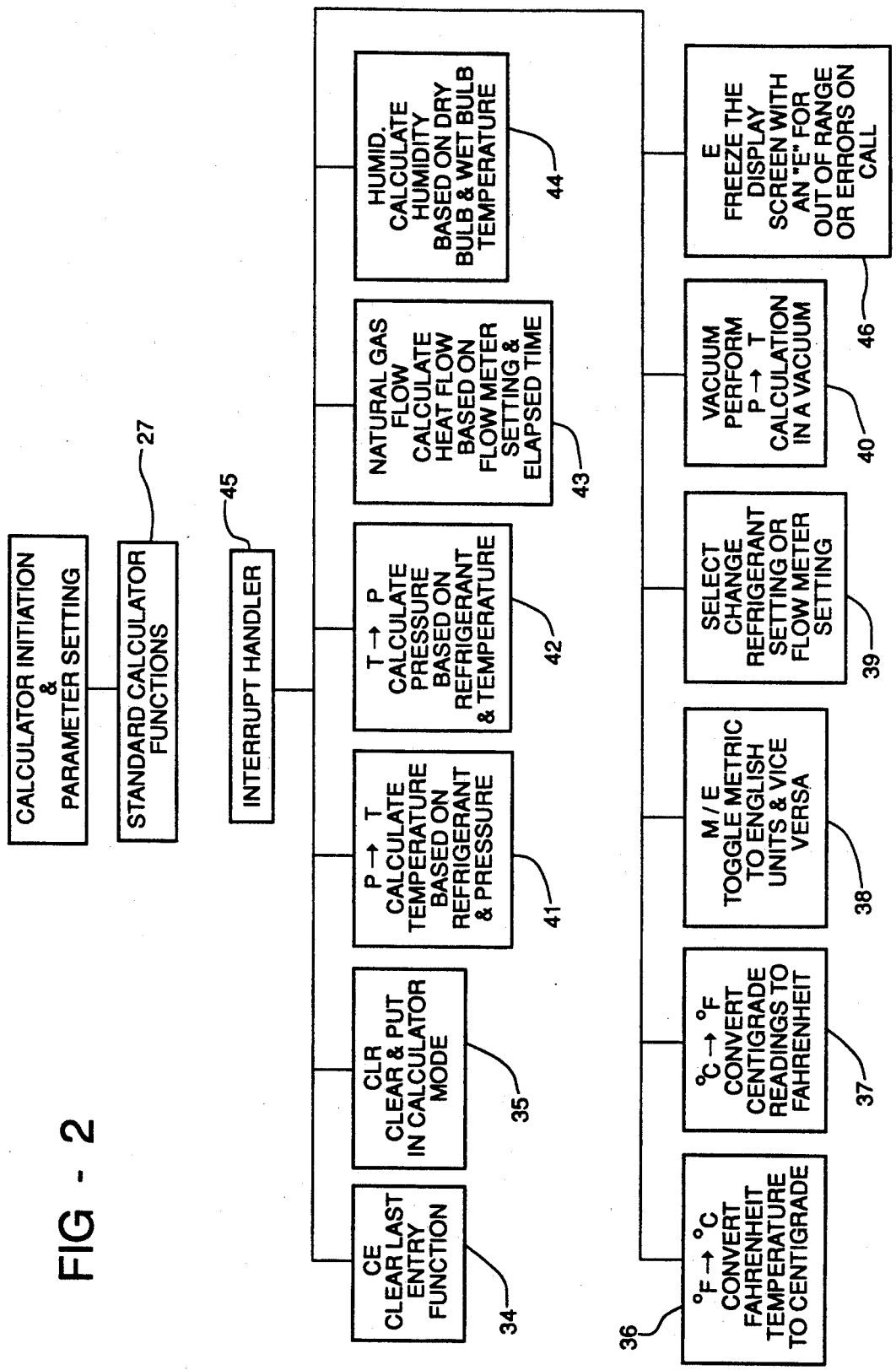

Referring to FIG. 1, a calculator apparatus 10 includes a foldable housing 11 with a lower portion 13 housing a numeric and function keypad 18 and an on-off switch 14. The lower portion 13 is pivotably mounted through pivot assembly 15 to an upper housing portion 17 that houses a display screen 22. The on-off switch is actuated by the closing and opening of the foldable housing 11 to automatically turn off the calculator apparatus 10 when the housing 11 is folded closed and turns on the calculator apparatus 10 when the foldable housing 11 is opened.

Figure 18:
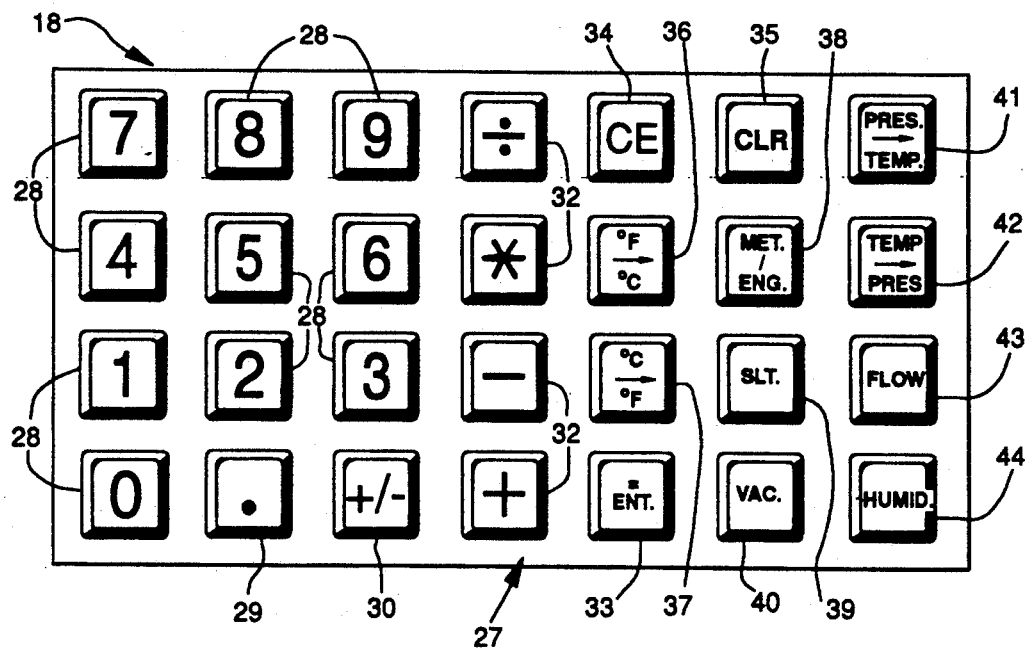
FIG. 18 is a top plan view of a keyboard according to the invention.

Referring to FIG. 1a, the calculator apparatus 10 functional parts are schematically illustrated. The functional apparatus 10 includes a power source 12, the on/off switch 14, a microprocessing unit 16, the numeric and function keyboard 18, storage registers 20, the display screen 22, a unit select switch 24, and a timer 26. FIG. 18 is a more detailed view of the numeric pad and function keyboard 18. The keyboard 18 contains numeral keys 28, decimal point 29 and positive-negative sign 30. Keys 28, 29 and 30 can be generally described as value keys 27. The keyboard 18 also includes arithmetic function keys 32, enter/equal key 33, clear/entry key 34, and clear key 35. The keyboard 18 also has a series of function keys 36 through 44. Each key 34 through 44 is a function key for an interrupt handler system 45 shown in FIG. 2. The interrupt handler interrupts the standard calculator functions 27. Each key 34 through 44 will be explained as follows along with the function corresponding thereto.

Figure 19:
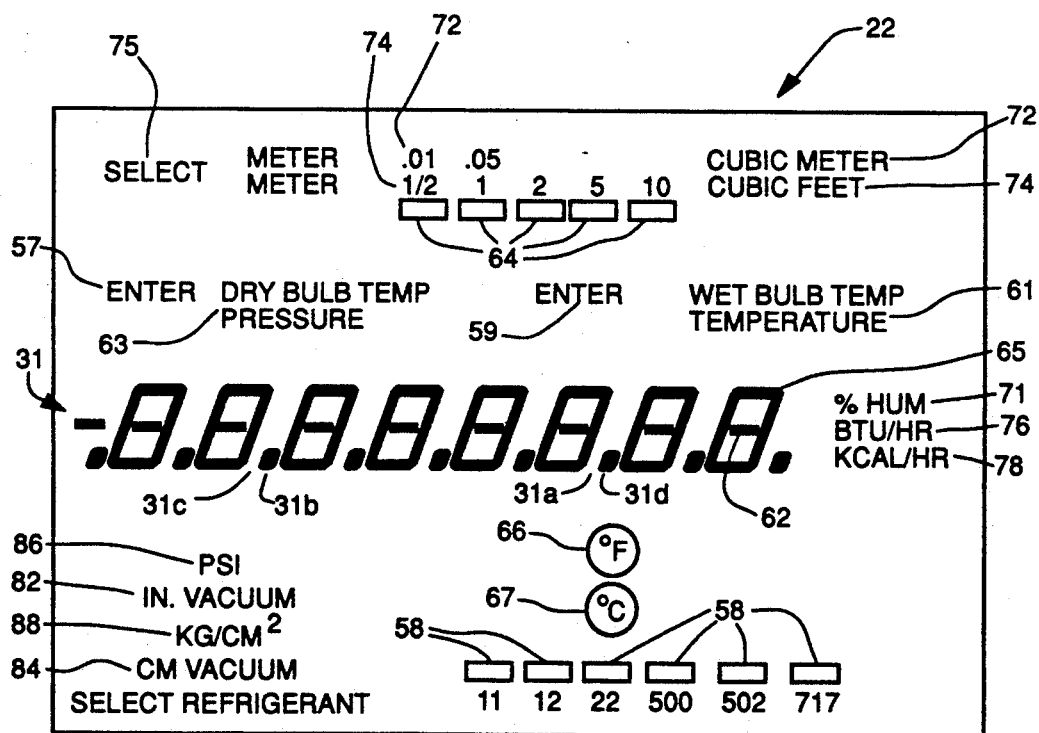
FIG. 19 is a view of the display screen shown in FIG. 1 with all elements of the screen displayed.

The display screen 22 is shown in detail in FIG. 19. The display screen can constructed with the known liquid crystal displays commonly used with portable calculators due to its low power usage. The display screen 22 has an alpha-numerical display 31 and a variety of labels, enunciators and indicators that will be explained in more detail as the various modes of the apparatus 10 are explained.

The microprocessing unit 16 can be one of several commercially available units that contain an integral LCD driver and contains a program that effectively carries out the functions and calculations as described as follows and which are illustrated in the accompanying FIGS. as flow charts.

Figure 3:
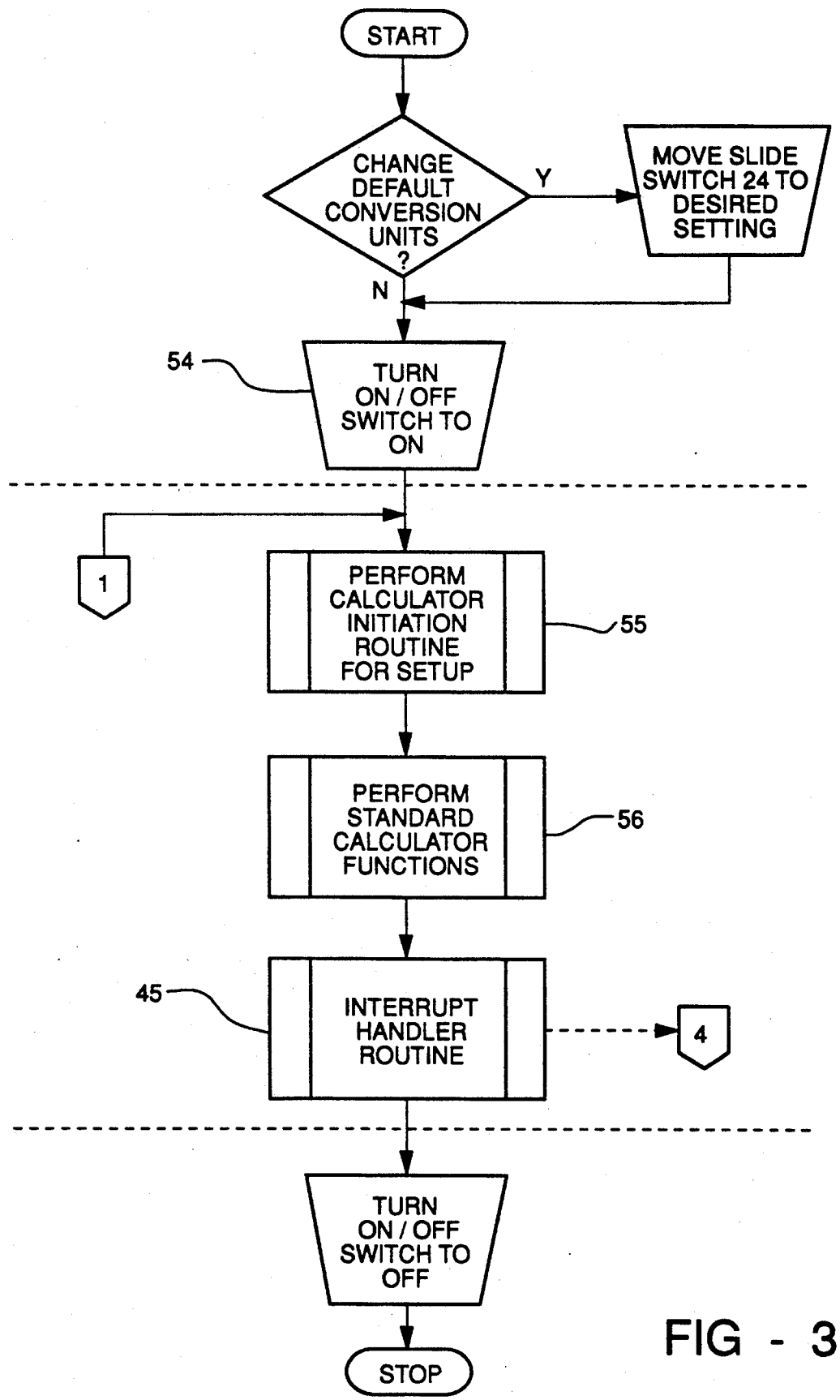
FIG. 3 is a flow chart illustrating the manner of operation of the calculator apparatus.

Referring now to FIG. 3, a unit select switch 24 is toggled between a Metric or English position. The position determines the default units in which the calculator works when turned on. This switch 24 is preferably inside the housing 11 and not easily accessible to the operator of the unit. The unit select switch 24 is set during assembly of the unit 10 depending on the intended marketplace. If the unit is intended for the United States, the English position is selected. If the calculator apparatus 10 is intended for Europe, the Metric position is selected. Once the unit 10 is assembled, the switch 24 is preferably not accessible without disassembly of the housing 11.

Figure 4:
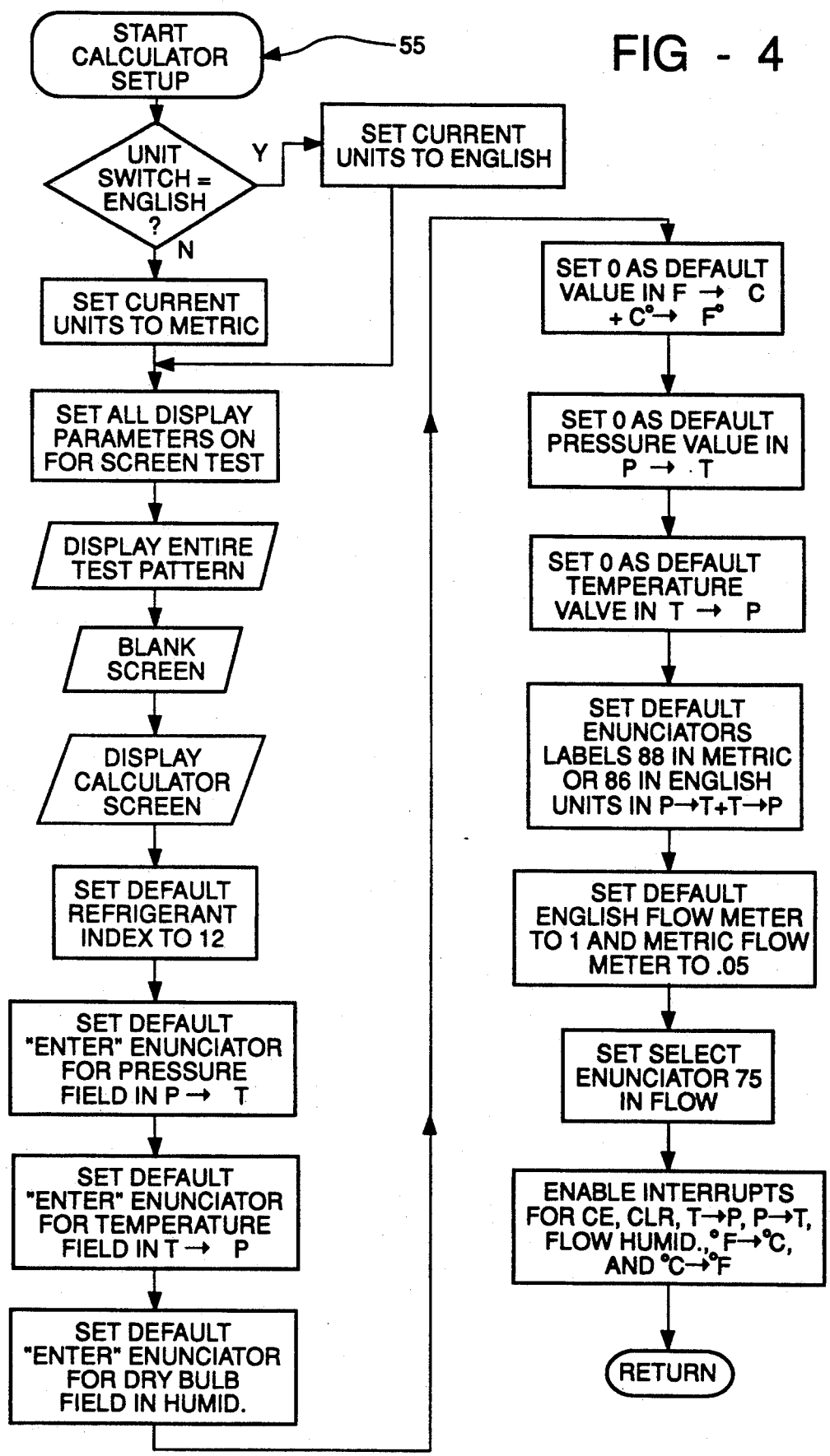
FIG. 4 is a flow chart illustrating the initiation routine for set up.

To operate the calculator apparatus 10, the on/off switch 14 is turned on as shown in step 54 shown in FIG. 3. The calculator then performs its initiation routine for setup as shown in step 55 based on the position of the select switch 24. The details of step 55 are shown in FIG. 4. The calculator determines if the unit switch 24 is in English. If so, it sets the current units to English. If not, it sets the current units to Metric. The default refrigerant index is set to 12 and the default English flow meter to 1 cubic foot. If the units are in Metric the Metric flow meter is defaulted to 0.05 cubic meters. The "enter" enunciator 57 for the pressure in the pressure to temperature conversion mode is defaulted. The "enter" enunciator 59 for the temperature in the temperature to pressure conversion mode is also defaulted. The "select" enunciator 75 is defaulted in the natural gas flow mode. The "enter" enunciator 57 over the dry bulb entry is defaulted in the humidity mode. All of the display parameters are on for the screen test and all the elements of the display screen 22 are displayed. The screen 22 then blanks out for a fraction of a second. A zero and a decimal point then appear in the alpha-numerical display 31 at the last placed digit 65 all the way to the right. The interrupt keys and functions 34, 35, 36, 37, 41, 42, 43 and 44 are then enabled.

The calculator apparatus 10 is in the calculator mode as shown in step 56 in FIG. 3 with all value keys 27 and arithmetic function keys 32 operable. The calculator as shown by the keyboard in FIG. 18 can provide the standard arithmetic functions of adding, subtracting, multiplication and division and display up to eight value places in alpha-numerical display 31 as illustrated in FIG. 19.

Figure 5:
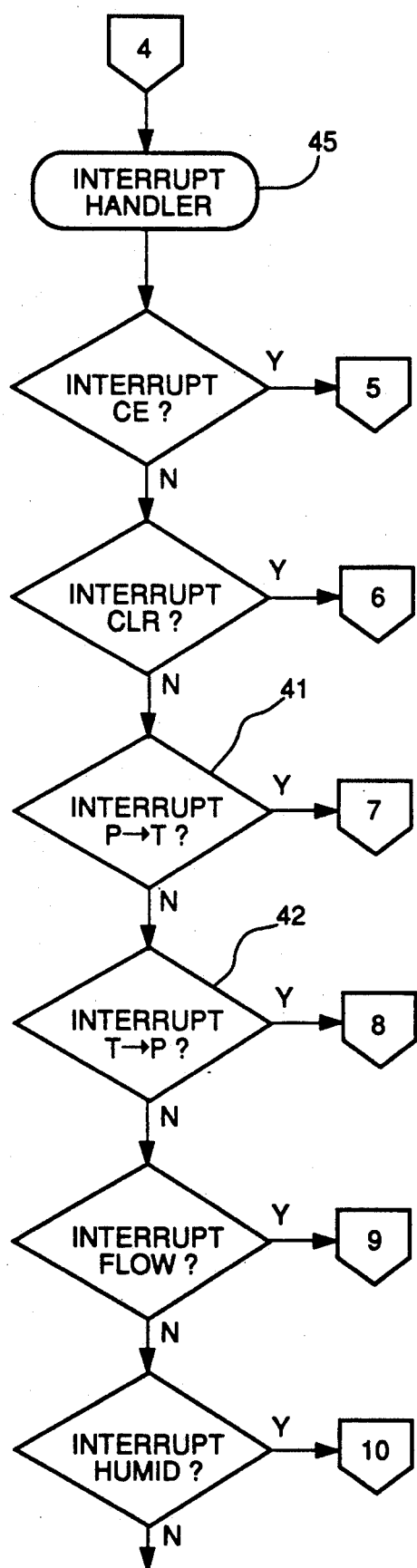
FIG. 5 is a flow chart illustrating the interrupt handler systems.
Figure 5:
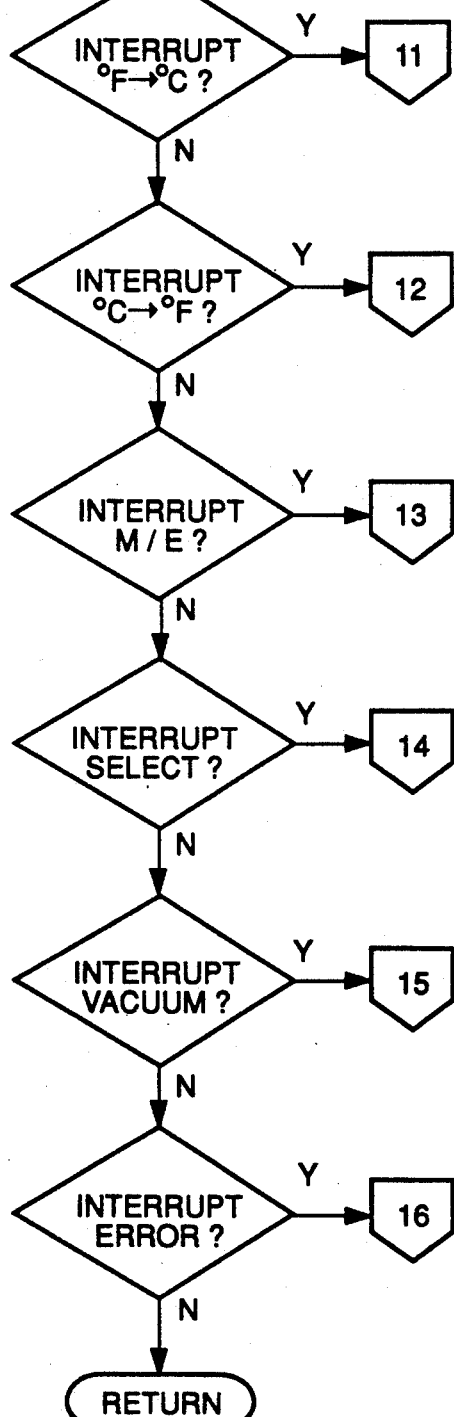

If one of the enabled interrupt keys 34, 35, 36, 37, 41, 42, 43 or 44 is pressed, the interrupt handler routine 45 commences as illustrated in FIG. 5. The interrupt handler determines which of the enabled interrupt functions is activated. Each interrupt function will now be explained.

Figure 8:
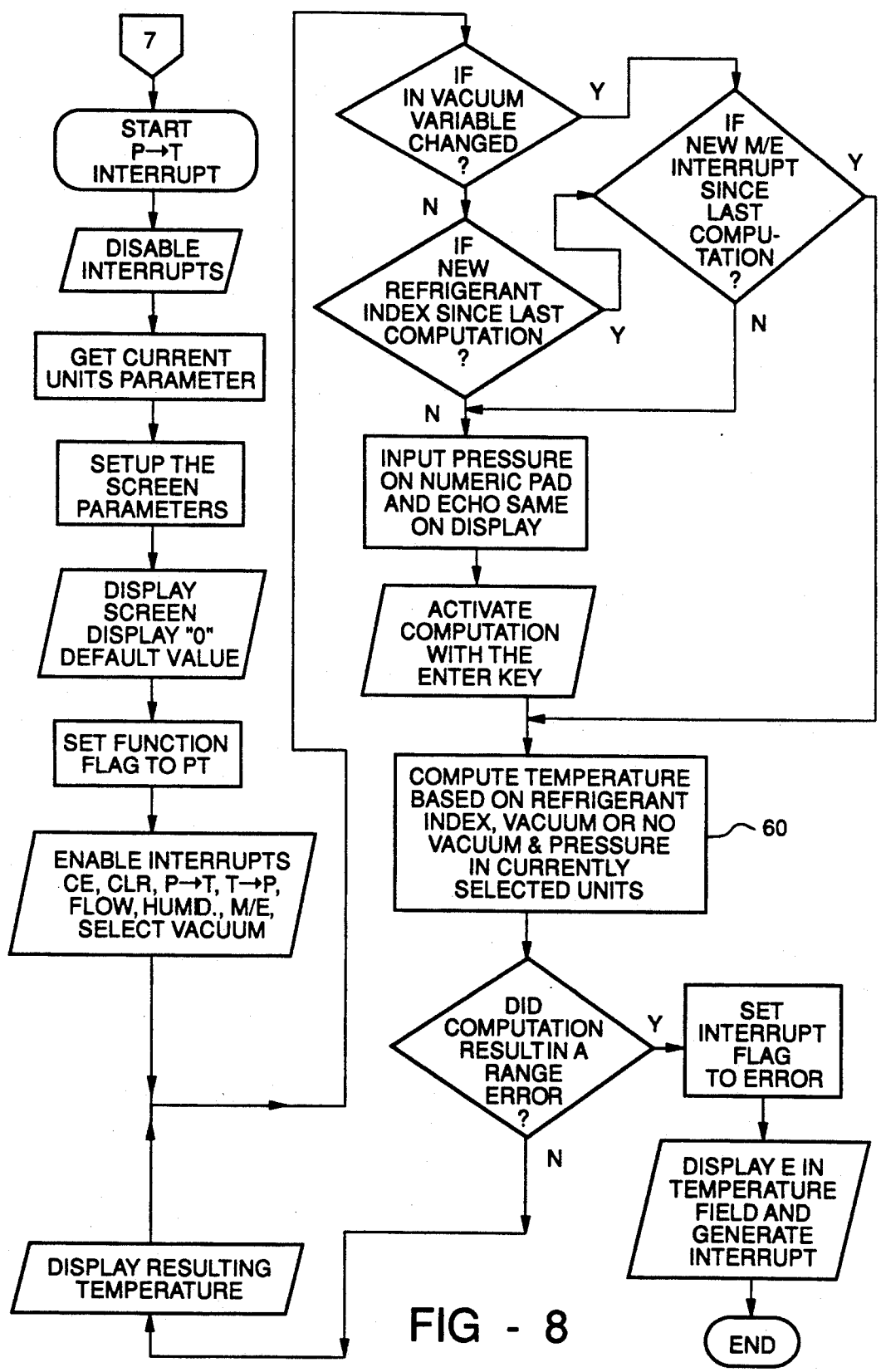
FIG. 8 is a flow chart illustrating the pressure-to-temperature conversion system.
Figure 20:
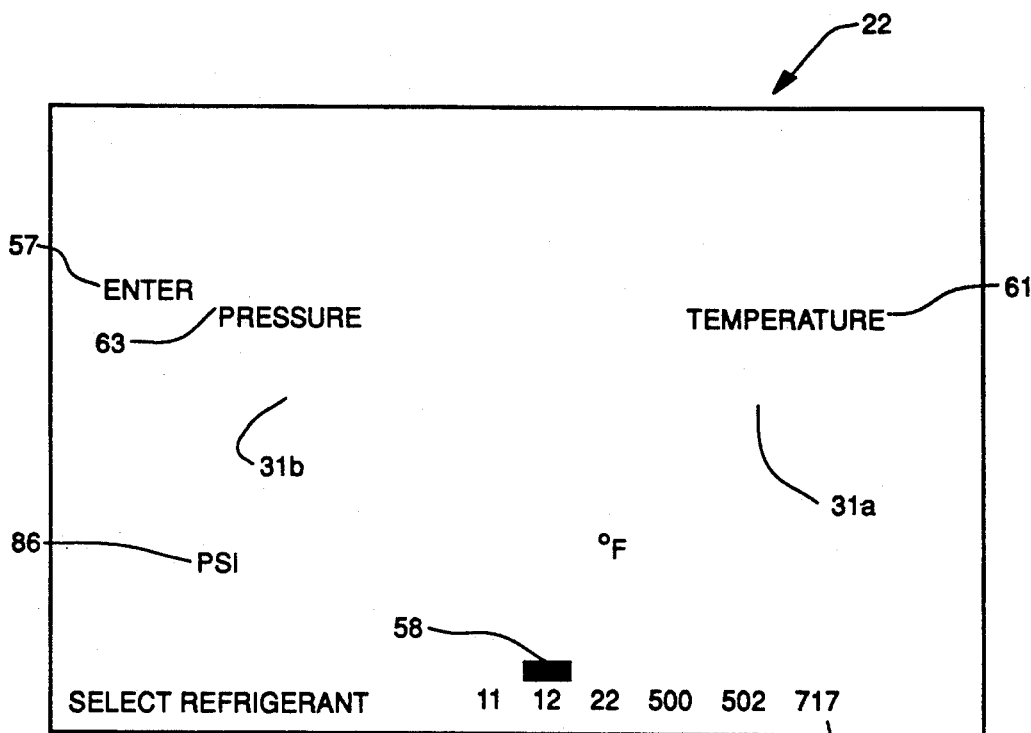
FIG. 20 is a view of the display screen when the pressure-to-temperature mode is selected in English units.

If key 41 is pressed, a flow chart routine displayed in FIG. 8 commences. The key 41 commences a pressureto-temperature conversion calculation in which pressure of a particular refrigerant is inputted and the resulting temperature is calculated. The interrupt handler 45 is temporarily disabled while the current units parameters set by key 24 is determined. The screen parameters are then set up and the display screen 22 as shown in FIG. 20 is displayed with the select refrigerant indicator 58 set at refrigerant 12. The enter enunciator 57 is shown adjacent the pressure label 63 to instruct one to input a pressure value. The function flag in the system is set to the pressure temperature function and the interrupt keys 34, 35, 38, 39, 40, 41, 42, 43 and 44 are enabled. The alpha-numerical display shows a default reading of zero render the pressure label 63 as a beginning value which can be entered if so desired. The specifics of the alpha-numerical display 31 will be detailed later relating to the pressure value and temperature value. For now, it is only needed to know that the pressure value is located in pressure field 31b of alpha-numerical display 31 under pressure label 63 and the temperature value is located under the temperature label 61 in temperature field 31a of numerical display 31. The interrupt keys 34, 35, 41, 42, 43, 44, 39 and 40 are then enabled as well as keys 28 and inputted numeral is displayed on display screen 22 under the pressure label 63 in the pressure field 31b. The refrigerant index 80 is selected as explained later. The enter key 33 is then activated and the temperature based on the selected refrigerant index, the status of the vacuum interrupt key 40 and the currently selected Metric or English units is computed as shown in step 60. The registers 20 have for each refrigerant the corresponding pressure for every 10° F. If a pressure is chosen between two entries, a straight line interpolation is computed.

The calculator then checks whether the computation resulted in a range error. If there is no range error the display indicates the resulting computed temperature under the temperature label 61 in temperature field 31a shown in FIG. 20. If the computation result did cause a range error, the interrupt flag is set to error and an E is displayed in the temperature field 31a of the numerical field 31 and generates an interrupt.

Figure 9:
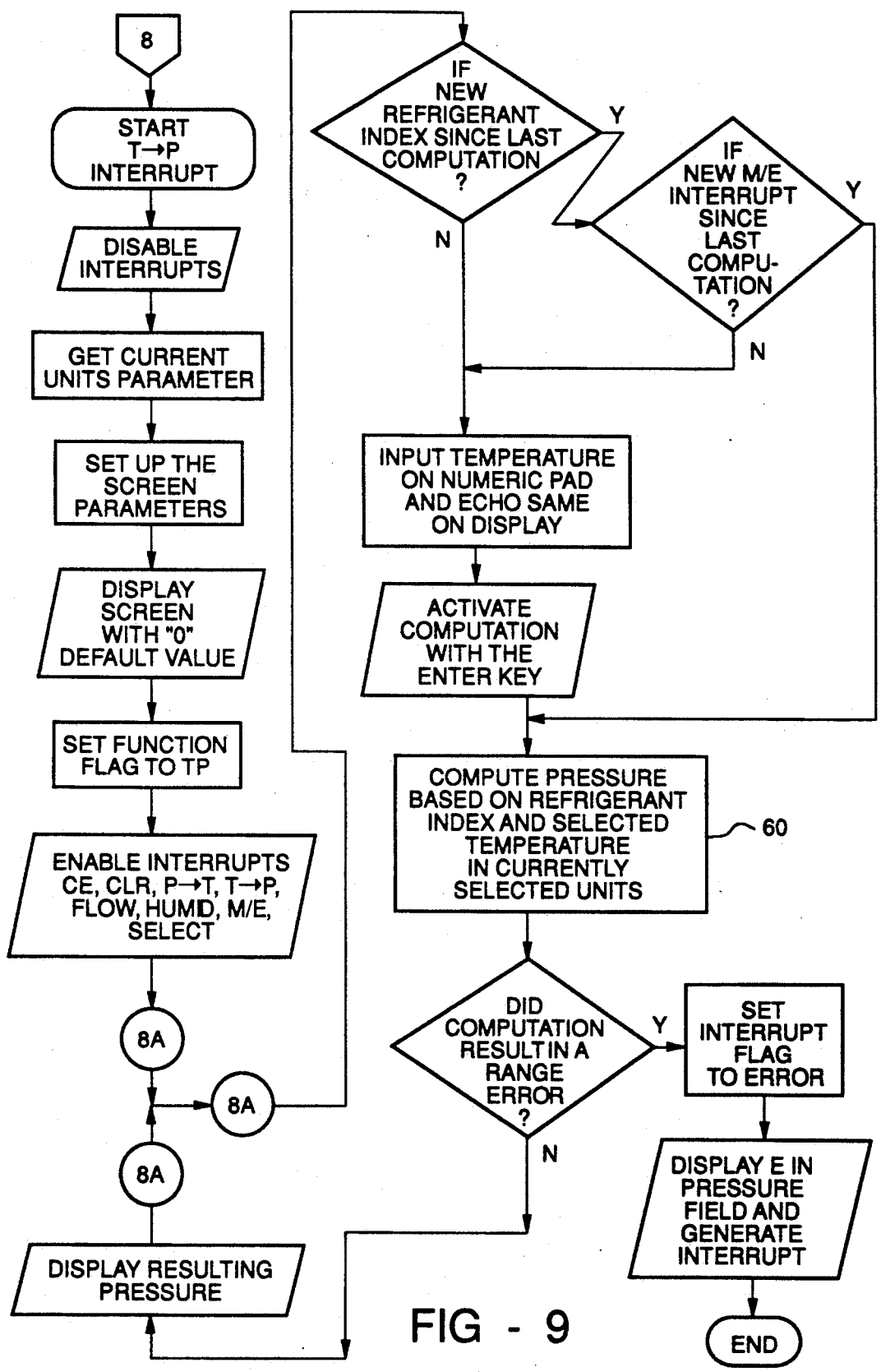
FIG. 9 is a flow chart illustrating the temperature-to-pressure conversion system.
Figure 21:
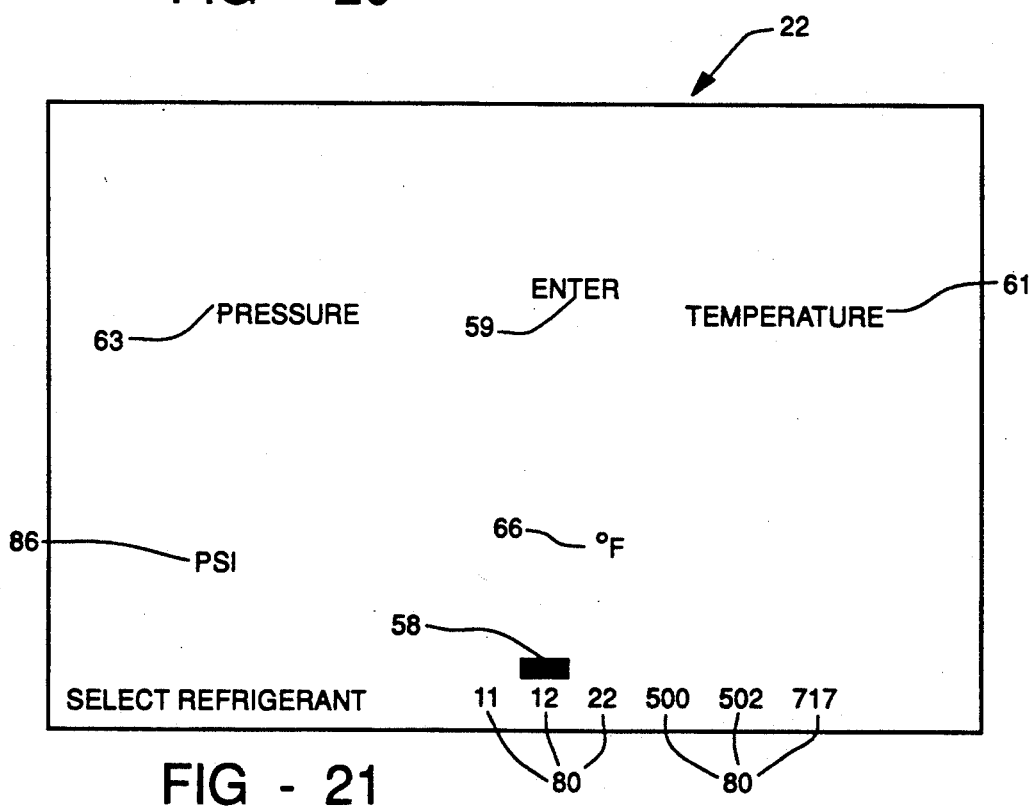
FIG. 21 is a view similar to FIG. 20 when the temperature-to-pressure mode is selected in English units.

Referring back to FIG. 5, if the temperature-to-pressure function key 42 is pressed, the temperature pressure conversion system commences. The flow chart illustrated in FIG. 9 is now referenced. The flow chart of FIG. 9 is similar to the one shown in FIG. 8. One difference is that the temperature is inputted to compute a pressure with the display showing the resulting pressure value under pressure label 63 in pressure field 31b in FIG. 21. A default 0 value is initially displayed under temperature label 61 which can be used as the beginning value entered if so desired. Key 30 is also enabled for entering negative temperature values. The enter communicator 59 is on to instruct one to input a temperature value. A second difference is that the vacuum interrupt key 40 is not enabled. A third difference is that if an error flag is generated, the E is displayed in the pressure field 31b of alpha-numerical display 31 of screen 22. If a temperature is selected between two temperatures stored in registers 20, a straight line interpolation is conducted to compute the corresponding pressure.

Figure 10:
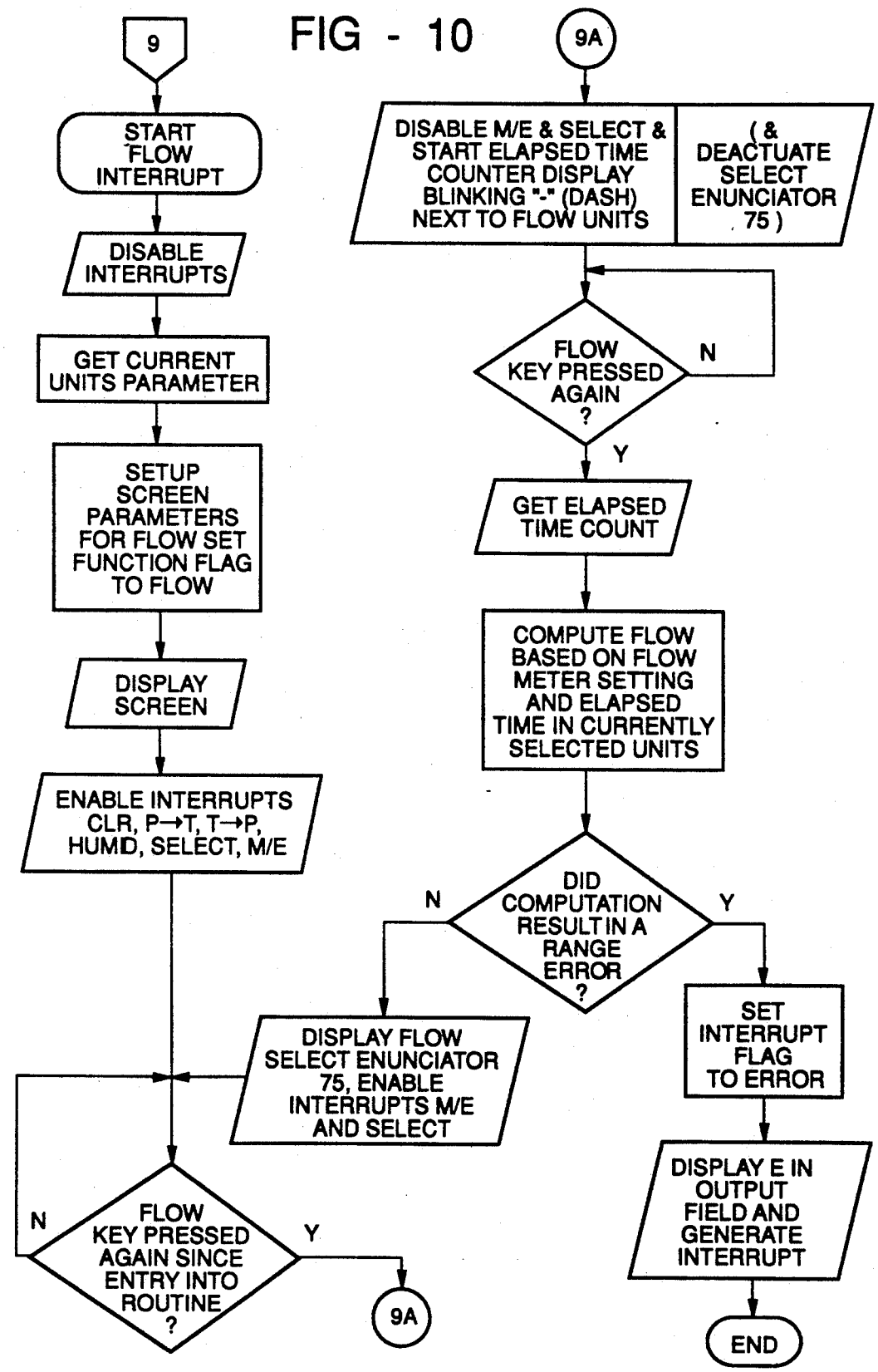
FIG. 10 is a flow chart illustrating the flow-energy conversion system.
Figure 22:
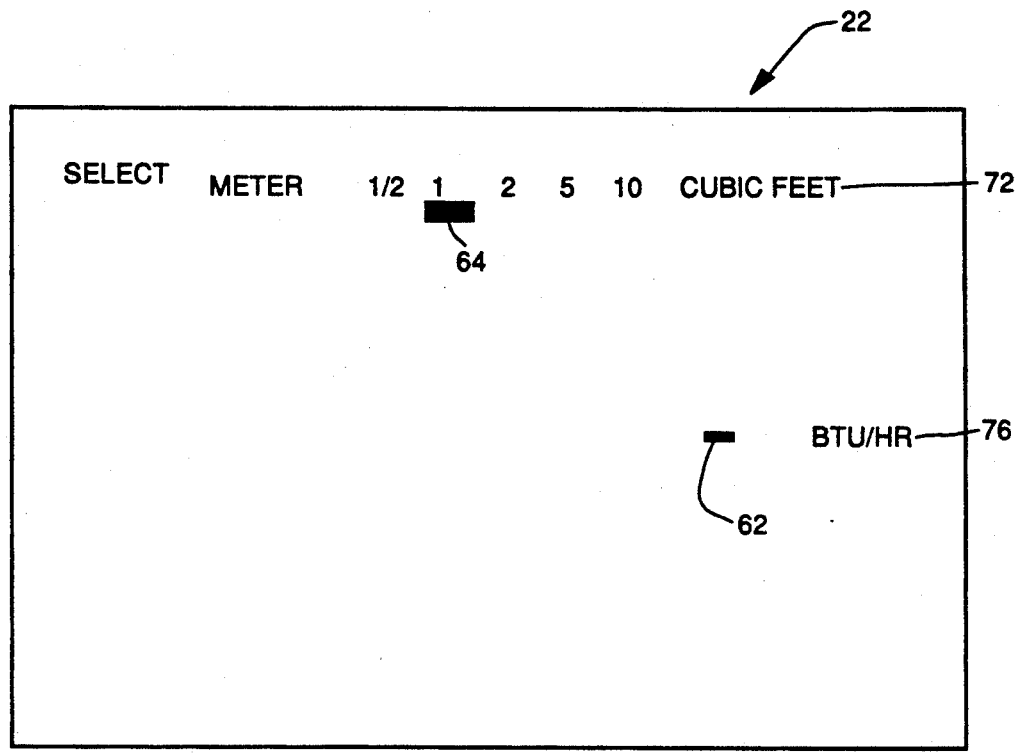
FIG. 22 is a view of the display screen when the flow energy rate mode is selected in English units.

If the flow key 43 is pressed, the natural gas flow-energy rate conversion system is activated as shown in FIG. 10. The interrupts are momentarily disabled until the apparatus 10 obtains the current unit parameter, sets up the screen parameters for the flow, sets the functions, and flags the function to indicate the flow function. The display screen then appears as shown in FIG. 22 if it is set in English units. The interrupt keys 35, 38, 39, 41, 42 and 44 are then enabled. A meter dial 74 is chosen as described later. The select enunciator 75 is shown next to the meter dial 74. The apparatus 10 then waits for the flow key to be pressed again at which time the Metric-/English key 38 and the select key 39 are disabled and the timer 26 is activated. The select enunciator 75 is deactivated and a blinking dash 62 next to the flow units is activated and continues to flash until the flow key 43 is pressed again to stop timer 26. The flashing indicator 62 is the cross bar indicator in the last placed digit 65 of numerical display 31. The elapsed time count measured by timer 26 is read. The energy rate based on the flow meter indicator 64 position, the currently selected Metric or English units and the elapsed time is then computed. The equation that is incorporated to convert the flow into energy rate is:

$$\frac{3600 \times \text{dial size} \times (BTU \text{ value/volume of gas})}{\text{number of seconds for one revolution of dial}} = BTU/HR.$$

If the computation did not result in a range error the energy rate is displayed in numerical display 31 with either label 76 or label 78 activated depending on whether Metric or English units were used. The Metric-/English and select keys 38 and 39 are once again enabled and select enunciator 75 is reactivated. The display is maintained until the other interrupts are activated or the flow key 43 is pressed again. If a computation resulted in a range error, the interrupt flag is set for the error and an E is displayed on the screen in the alpha-numerical display 31.

The calculator is calibrated to time one complete revolution of a selected meter dial and calculate the energy rate based on the use of natural gas. For example, if the meter has a dial labeled 5 cubic feet, the flow indicator key 43 is initially pressed to activate the timer and is not pressed again until one revolution of the one of the dial is completed. The selected meter dial 64 is chosen dependent on the speed of its rotation. If the fuel rate is such that it is too long to wait for the 5 cubic foot dial to rotate, the one cubic foot dial may be selected. On the other hand, if the flow rate is too large such that the time frame is too short to render an accurate reading, the 10 cubic foot dial may be selected. The selection of the dial is based on both the convenience accuracy in timing. Of course, if the Metric units are chosen the meter dial will display either 0.01 cubic meters or 0.05 cubic meter with the choice being made according to the same parameters above.

Figure 11:
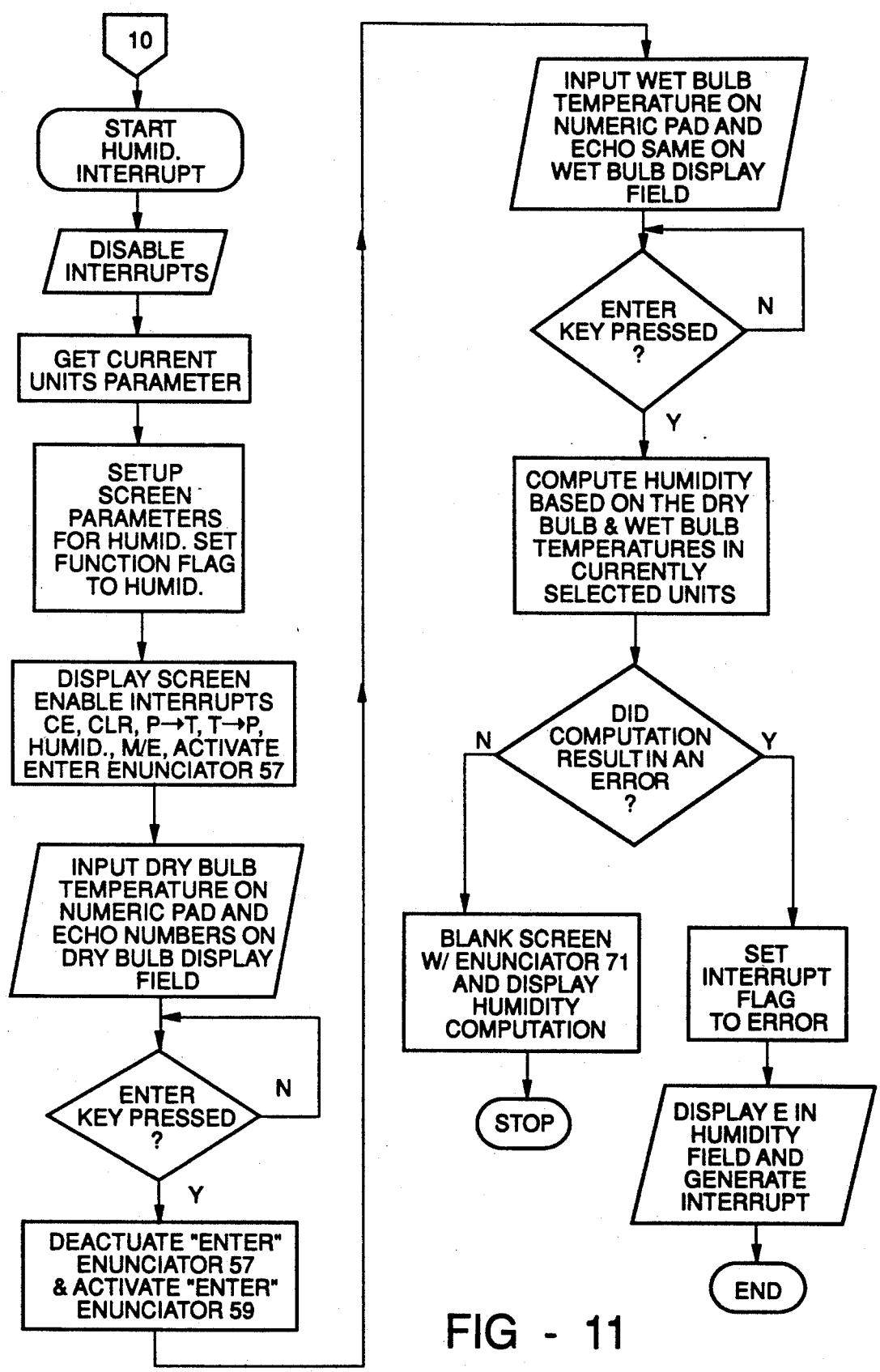
FIG. 11 is a flow chart illustrating the relative humidity system.
Figure 23:
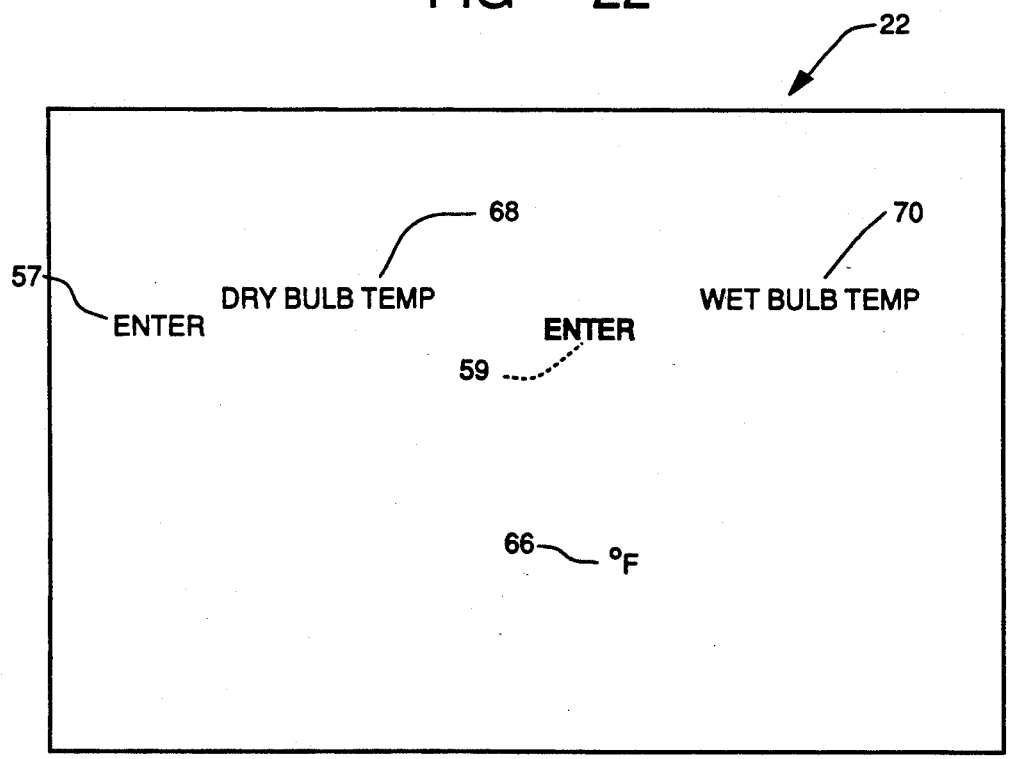
FIG. 23 is a view of the display screen when the relative humidity mode is selected in English units.

If the relative humidity function key 44 is activated, the system shown in FIG. 11 is commenced. The interrupts are temporarily disabled while the current units parameters are obtained. The screen parameters for the humidity function is also set up with the function flag set to the humidity label. The screen is then displayed as illustrated in FIG. 23 when English units are selected. The interrupt keys 34, 35, 38, 41, 42, 43 and 44 are enabled to indicate Fahrenheit degrees at label 66. If the units are displayed in the Metric selector switch 38 is pressed and the F° label 66 will change to a C° label 67. The "enter" enunciator 57 is activated to indicate entry of a dry bulb temperature value. The input dry bulb temperature is then inputted via the numeric pad 18 and the inputted dry bulb temperature is displayed in dry bulb field 31c on screen 22 under dry bulb temperature label 68. The enter key 33 is pressed. The enter enunciator 57 is deactivated once the enter enunciator 59 is activated to indicate entry of a wet bulb temperature value. The input wet bulb temperature is then inputted on the numeric keypad 18 and the numeral is displayed in wet bulb field 31d under wet bulb temperature indicator 70. The enter key 33 is pressed a second time to initiate completion of the relative humidity based on the inputted dry bulb and wet bulb temperatures. If the computation did not result in an error the screen changes to a relative percentage in humidity with a number from 1 to 100 in numerical display 31 preceding the activated label 71 shown in FIG. 19. If the computation did result in an error, the interrupt flag to error is set and an E is displayed in the alpha-numerical display 31 and the interrupt is generated.

In the previously discussed pressure-to-temperature conversion mode, temperature-pressure conversion mode, and natural gas flow-energy conversion mode, it is seen that the alpha-numerical display 31 can display more than a single eight digit value. As shown in more detail in FIG. 24, in the pressure-temperature and temperature-pressure conversion modes, the alpha-numerical display 31 is divided into two fields, the temperature field 31a and the pressure field 31b, each of which can display a three-digit value. A temperature field 31a also includes a middle dash 62a to indicate negative values. The digit 65b and the remainder of digit 65a are left blank to provide a gap 87 between the two fields 31a and 31b.

Similarly, as shown in FIG. 25, the alpha-numeric display 31 provides a dry bulb field 31c and a wet bulb field 31d, each having three place values. Both fields also include a middle dash 62a and 62b to provide negative values. Digit 65b and the remainder of digit 65a provide for gap 87a between the two fields 31c and 31d.

If the Fahrenheit-to-centigrade conversion key 36 is pressed when enabled, the system shown in FIG. 12 is commenced. At the start of the Fahrenheit-to-centigrade conversion interrupt, the active interrupts are disabled. A number inputted on the calculator display is computed to centigrade from its initial Fahrenheit condition with a C° label 67. The equation used is 9/5 (F° − 32) = C°. After the computation is displayed on the calculator, the disabled interrupts are enabled.

If the centigrade-to-Fahrenheit interrupt is pressed the system shown in FIG. 13 is commenced. The active interrupts are temporarily disabled. The number inputted on the calculator display is computed to Fahrenheit from the initial centigrade representation using equation 5/9C° + 32 = F°. If the computation did not result in a range error the temperature is displayed with its Fahrenheit label 66. If the computation resulted in a range error, the interrupt flag is set to error and an E is displayed on the or display field and an error interrupt is generated. It should be noted that the zero default displayed in the calculator mode can be the inputted temperature value to be converted in either C° or F° Furthermore, the resulting conversion value can be used as the first entry for the calculator mode.

Figure 14:
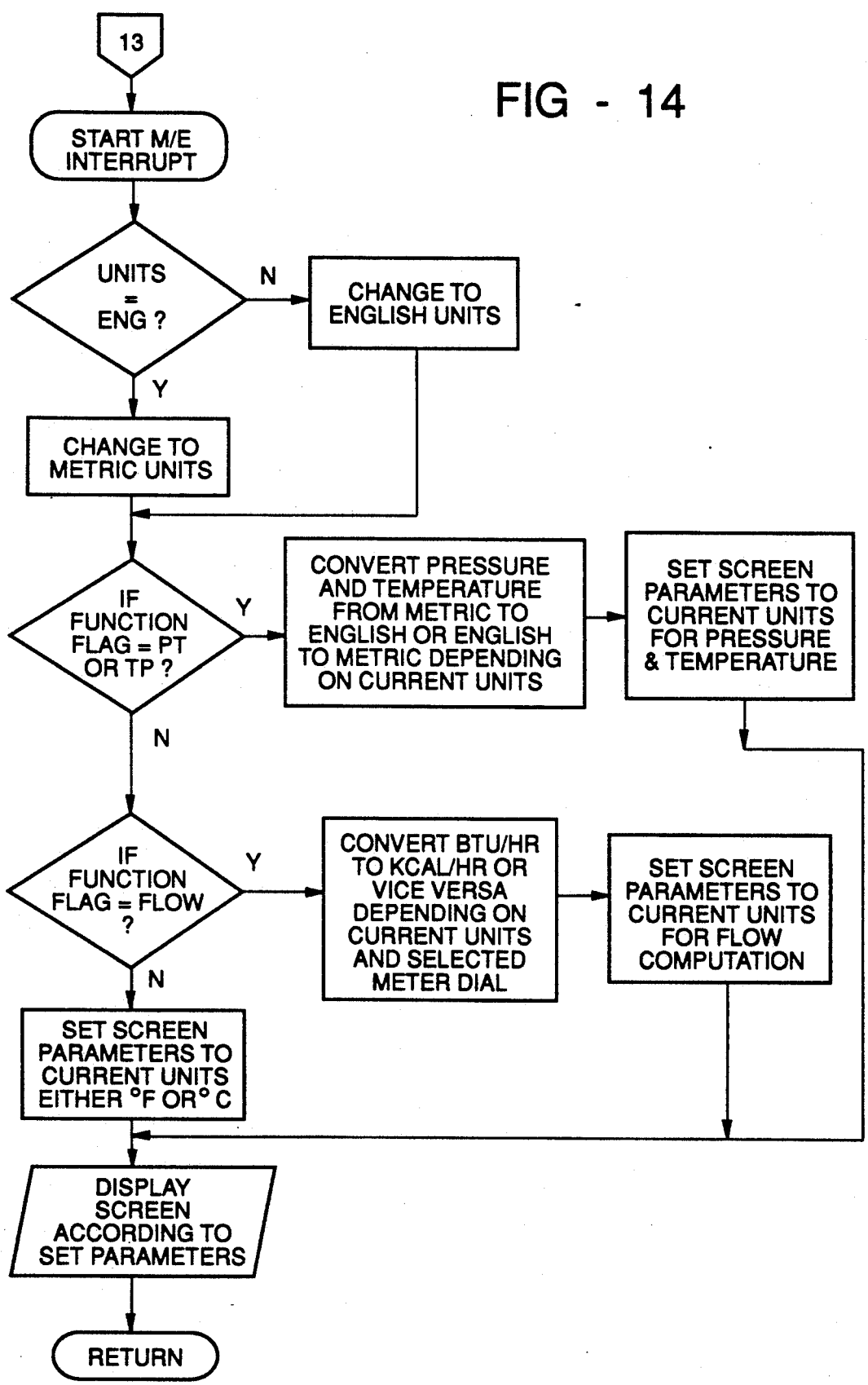
FIG. 14 is a flow chart illustrating the Metric/English interrupt selector.

Reference now is made to FIG. 14. The Metric-to-English interrupt is activated every time the toggle switch key 38 is pressed when it is enabled. If the units are originally in English the units are changed to Metric and if the units are not originally in English it changes to English. If the function flag is in pressure-temperature conversion mode or temperature-pressure conversion mode the pressure and temperature units are converted from Metric-to-English or English-to-Metric depending on the current status of the units and the screen parameters are displayed to the current units. If the function flag is in the flow mode, the meter dial is toggled between cubic feet and cubic meters with the appropriate display line 72 and 74 displayed along with the appropriate label 76 or 78 displayed as shown in FIG. 19. The screen display is set according to these set parameters. If the function flag is in the relative humidity mode, the screen parameters are toggled between F° label 66 and C° label 67. The screen display is set to these parameters. It should be noted that the M/E interrupt is not activated in the calculator mode.

Figure 15:
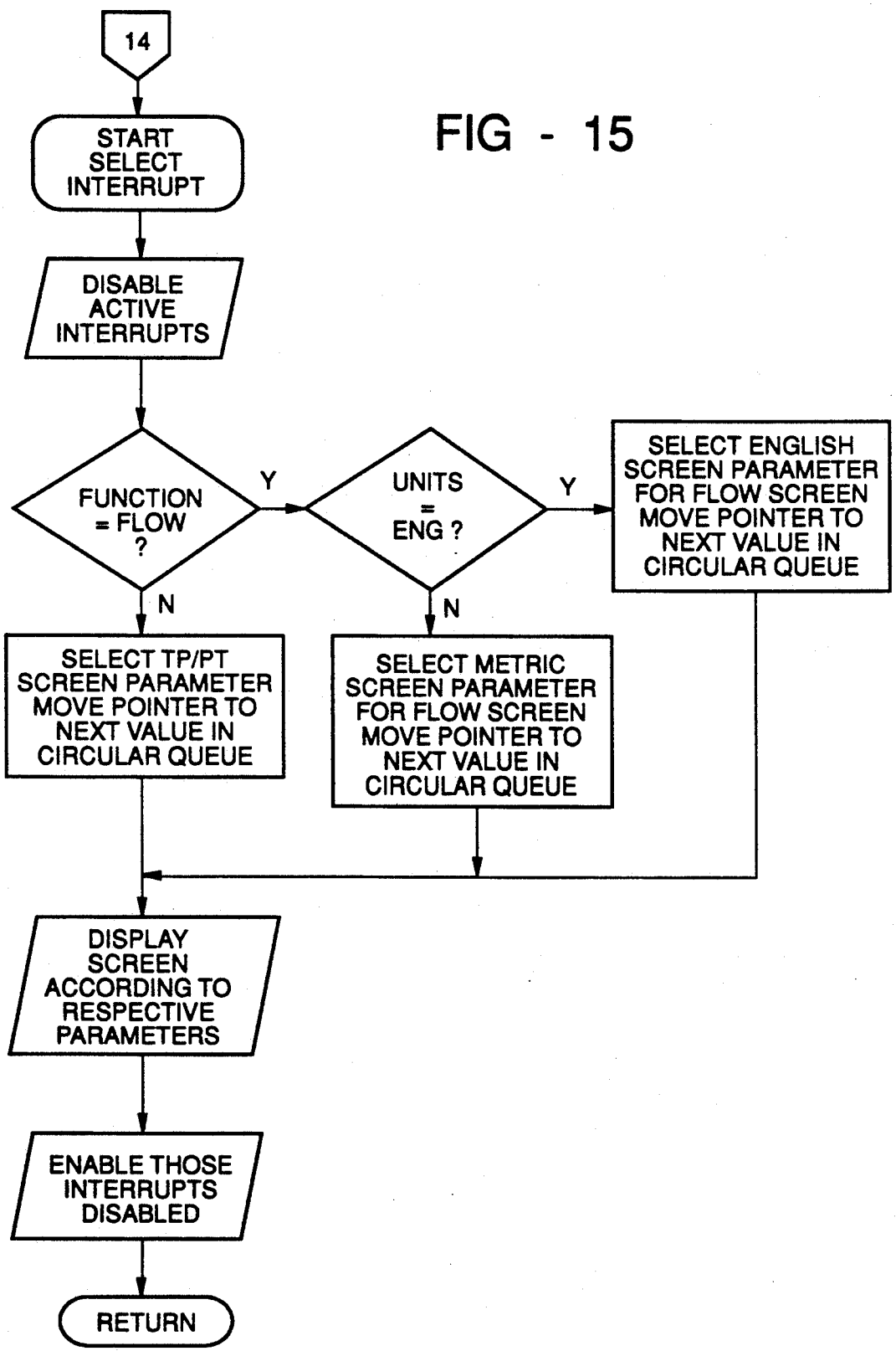
FIG. 15 is a flow chart illustrating the select interrupt system.

Reference is now made to FIG. 15. If the select key 39 is pressed when it is enabled, the active interrupts are temporarily disabled. If the function is in the flow mode, and the units are in English, the English screen parameters for the flow screen are shown and the indicator 64 is moved to the next value in a circular queue under the corresponding dial labeled 74. If the units are not in English, the Metric labels 72 are shown and the indicator 64 is moved the next value of the smaller circular queue under the corresponding label 72. The screen is then displayed according to the respective parameters and the disabled interrupts are then re-enabled.

If the function is not in the flow mode, the temperature-to-pressure and pressure-to-temperature screen parameters are selected and the appropriate indicator 58 above the refrigerant numerals 80 is then visually displayed over the next numeral 80 in a circular queue. The screen is displayed according to the respective parameters and the disabled interrupts are then re-enabled.

Figure 16:
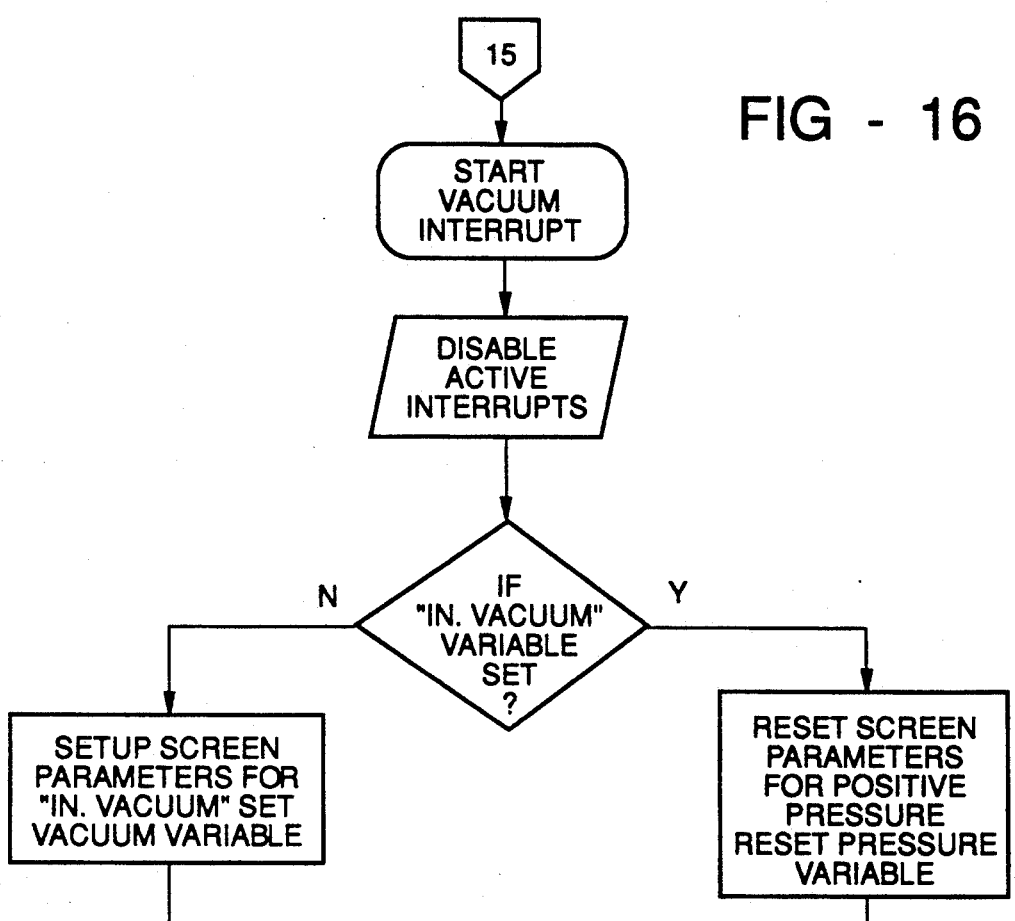
FIG. 16 is a flow chart illustrating the vacuum selector system.

The flow chart in FIG. 16 is now referenced. If the vacuum key 40 is pressed while the vacuum interrupt is enabled, the other interrupts are temporarily disabled and the screen parameters are set for inches vacuum or centimeters vacuum and the screen is displayed with either labels 82 or 84 depending on whether or not the flag is in Metric or English. If the parameters are already in the vacuum mode, and the vacuum key 40 is pressed, the parameters are set up for positive pressure and either labels 86 or 88 as shown in FIG. 19, are displayed depending on whether the Metric or English units are engaged.

Figure 17:
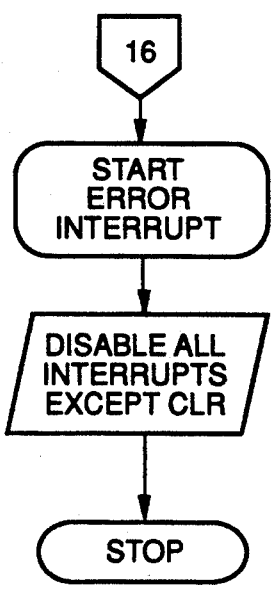
FIG. 17 is a flow chart illustrating the error interrupt system.

As illustrated in FIG. 17, if the error-interrupt flag is engaged as described before and the screen displays an E and all other interrupts except the clear function 35 are disabled. In order to disengage the error interrupt, one must turn the on/off switch 14 off or hit the clear key 35.

Figure 6:
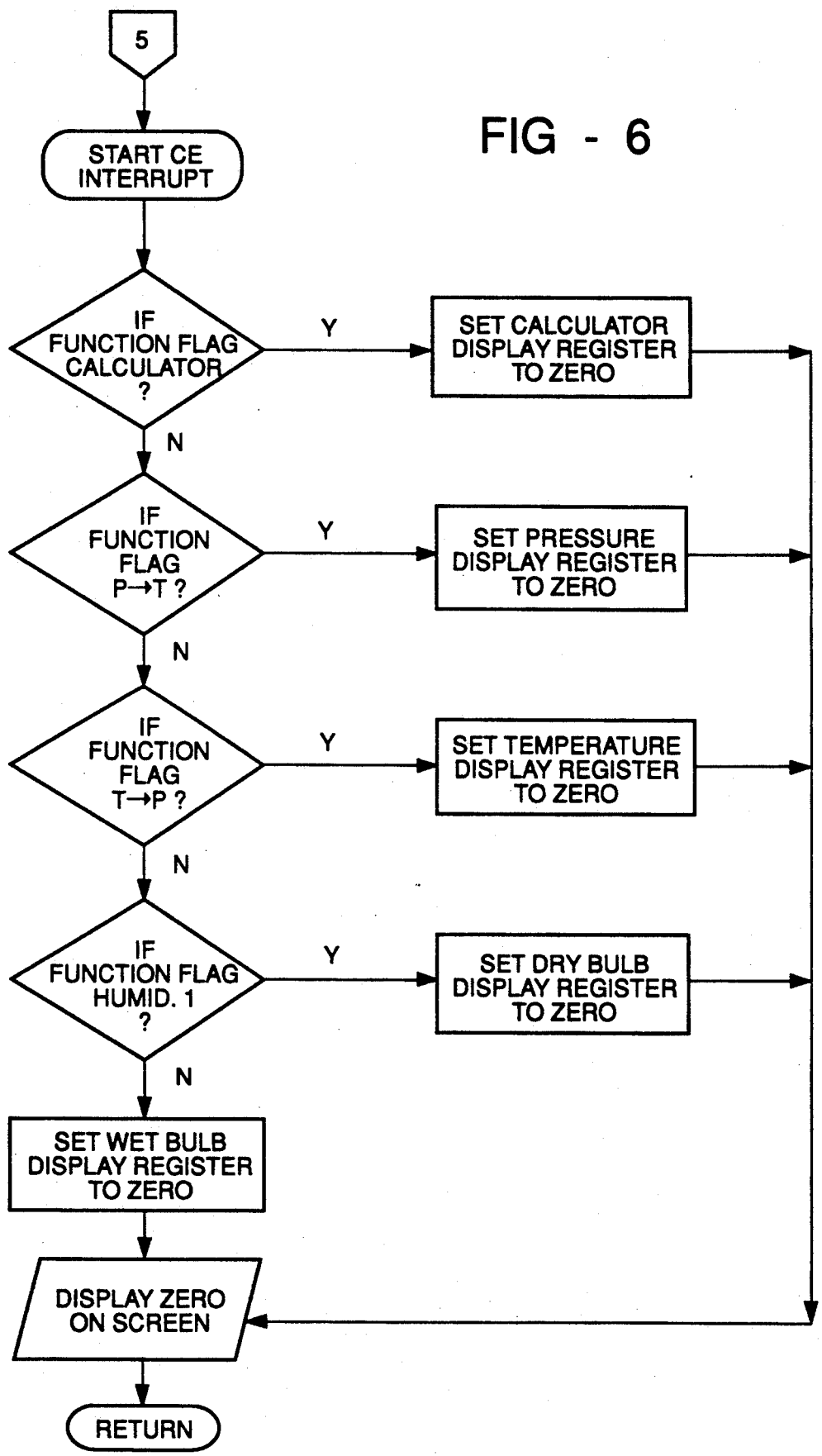
FIG. 6 is a flow chart illustrating the Clear Entry interrupt.

If the CE (clear last entry) key 34 is activated when enabled, the flow chart in FIG. 6 is followed. If the function flag indicates the calculator mode, the calculator display screen goes to zero. If the function flag indicator is in the pressure-to-temperature conversion mode, the pressure display register returns to zero. If the function flag is from temperature-to-pressure conversion mode, the temperature display register goes to zero. If the function flag is in the humidity first field, the dry bulb temperature display goes to zero. If not, the wet bulb temperature display register goes to zero. The zero of the appropriate display is shown on the screen and the system is returned to its previous mode.

If the CLR (Clear) key 35 is activated when enabled, the registers are cleared and the screen is displayed in the calculator mode with a "0" displayed at the last placed digit 65 in numerical display 31. Engagement of the Clear function disengages the error interrupt and reenables interrupt keys 34, 41, 42, 43, 44, 36 and 37.

In this fashion, a calculator apparatus 10 when in the natural gas flow-energy rate conversion mode can conveniently and efficiently determine whether the energy rate or firing rate of a heater exceeds its rated capacity by merely measuring the amount of time it takes for a dialed meter to rotate one revolution. The timer in the calculator is activated and deactivated by the operator based on rotation of the preselected dial and based upon the selection of the dial automatically calculates the energy rate supplied by the fuel flow.

Further more, temperature and pressure conversions are calculated by the calculator for the various pressures, vacuums, and temperatures of the refrigerants in the refrigeration cycle. Furthermore, relative humidity can be determined from dry bulb and wet bulb temperature inputs.

Other features such as the centigrade-to-Fahrenheit and Fahrenheit-to-centigrade conversion functions are also included. Other amenities such as the ability to operate in either Metric units or English units are built therein with a default unit that can be preselected. Arithmetic functions are also integrated into the calculator unit for basic functions as multiplication, subtraction or addition and division.

It is foreseen that these features can be incorporated in a portable calculator that is battery powered. Furthermore, the calculator can be incorporated in a carrying case that when closed automatically shuts off the calculator to save battery energy.

The arithmetic calculator program is any standard program adopted for the particular microprocessor used.

Other microprocessors and other hardware parts can be substituted and the invention should not be limited to the specific hardware parts, LCD displays, or specific keyboard patterns.

Other variations and modifications of the invention are possible without departing from its spirit and scope as defined by the appended claims.

The embodiments in which an exclusive property or privilege as claimed as defined as follows:

1. A conversion and measuring apparatus characterized by:
   a flow-energy rate conversion means for determining the energy rate supplied by a fuel flow said conversion means including;
   selection means for selecting units of fuel flow;
   input key means;
   a timer mechanism constructed to be turned on and off by the input key means to measure elapsed time for said selected units of fuel flow;
   calculation means for determining the energy rate based on said elapsed time and said selected units of fuel flow; and
   a display means for displaying said energy rate.

2. In as calculator apparatus a defined in claim further characterized by:
   a temperature conversion means including input means for inputting a temperature in one mode of measurement and converting said inputted temperature in one mode of measurement into a temperature in another mode of measurement.

3. A conversion and measuring apparatus characterized by:
   a flow-energy rate conversion means for determining the energy rate supplied by a fuel flow said conversion means including;
   selection means for selecting units of fuel flow;
   a timer mechanism constructed to be turned on and off to measure elapsed time for said selected units of fuel flow;
   calculation means for determining the energy rate based on said elapsed time and said selected units of fuel flow;
   a display means for displaying said energy rate; and
   a humidity conversion mode means for determining the relative humidity which is displayed on said display means wherein a dry bulb temperature and wet bulb temperature are inputted for determining the relative humidity which is displayed on said display means.

4. In a calculator apparatus having a keyboard for entering numbers and arithmetic operators, a display screen, a power source, and an on/off switch, the improvement characterized by:
   a temperature-to-pressure conversion mode wherein a temperature is inputted via said keyboard and a refrigerant is selected via said keyboard to determine the corresponding pressure;
   a pressure-to-temperature conversion mode wherein a pressure is inputted via the keyboard and a refrigerant is selected via said keyboard for determining the corresponding temperature;
   a humidity conversion mode wherein a dry bulb temperature and a wet bulb temperature are inputted via the keyboard for determining the corresponding relative humidity;
   an energy flow rate conversion mode for calculating an energy rate supplied by a fuel flow, said conversion mode including a fuel unit selection means for selecting one of several units of flow of metered fuel via said keyboard and a timer mechanism constructed to be activated and shut off via said keyboard to measure elapsed time for said select units of fuel flow;
   a mode selection means for selecting one of said modes; and
   said display screen for indicating one of said corresponding pressure, said corresponding temperature, said relative humidity and said energy rate corresponding to the selection of said mode selection means.

5. In a calculator apparatus as defined in claim 4 further characterized by:
   an indicator means for indicating when said timer mechanism is activated.

6. In a calculator apparatus as defined in claim 5 further characterized by:
   said indicator means is a flashing visual indicator.

7. In a calculator apparatus as defined in claim 6 further characterized by:
   said flashing visual indicator is incorporated in said display screen.

* * * * *